(12) United States Patent
Chen et al.

(10) Patent No.: US 10,794,400 B2
(45) Date of Patent: Oct. 6, 2020

(54) FAN WITH SHOCK-ABSORBING EFFECT

(71) Applicant: Yen Sun Technology Corp., Kaohsiung (TW)

(72) Inventors: Chien-Jung Chen, Kaohsiung (TW); Hsin-Hsien Wu, Kaohsiung (TW); Chih-Tsung Hsu, Kaohsiung (TW)

(73) Assignee: YEN SUN TECHNOLOGY CORP., Kaohsiung (TW)

( * ) Notice: Subject to any disclaimer, the term of this patent is extended or adjusted under 35 U.S.C. 154(b) by 33 days.

(21) Appl. No.: 16/239,953

(22) Filed: Jan. 4, 2019

(65) Prior Publication Data

US 2019/0219067 A1 Jul. 18, 2019

(30) Foreign Application Priority Data

Jan. 12, 2018 (TW) .............................. 107101147 A

(51) Int. Cl.
*F04D 29/66* (2006.01)
*F04D 29/52* (2006.01)
(Continued)

(52) U.S. Cl.
CPC ......... *F04D 29/664* (2013.01); *F04D 19/002* (2013.01); *F04D 25/0613* (2013.01); *F04D 29/522* (2013.01); *F04D 29/646* (2013.01); *F04D 29/668* (2013.01); *F16F 1/373* (2013.01); *F16F 15/08* (2013.01); *F05B 2240/14* (2013.01); *F05B 2260/30* (2013.01); *F05B 2260/96* (2013.01); *F05B 2280/4004* (2013.01)

(58) Field of Classification Search
CPC ....... F04D 29/664; F04D 29/60; F04D 29/601
See application file for complete search history.

(56) References Cited

U.S. PATENT DOCUMENTS 4,598,894 A * 7/1986 Johannes ................ F16F 1/373
248/615
9,222,479 B2 * 12/2015 Wei ..................... F04D 25/0613
(Continued)

FOREIGN PATENT DOCUMENTS

TW M381100 U 5/2010

OTHER PUBLICATIONS

EPO search report and opinion for EP18170315 (foreign filing of instant application) (Year: 2019).*
(Continued)

*Primary Examiner* — Eldon T Brockman
*Assistant Examiner* — Wesley Le Fisher
(74) *Attorney, Agent, or Firm* — Muncy, Geissler, Olds & Lowe, P.C.

(57) ABSTRACT

A fan includes a rotating unit and a housing unit. The rotating unit includes a base and a fan body that is rotatably mounted to the base. The housing unit includes an outer ring that surrounds and is connected to the base, a plurality of connecting members that are mounted to an outer peripheral surface of the outer ring and that are spaced apart from each other, and a base member that surrounds the rotating unit and the outer ring and that is connected to the connecting members. The base member has a plurality of receiving holes, and each of the connecting members is made of a shock-absorbing material, and is fixed in a respective one of the receiving holes.

7 Claims, 4 Drawing Sheets

(51) Int. Cl.
*F16F 1/373* (2006.01)
*F04D 25/06* (2006.01)
*F04D 29/64* (2006.01)
*F16F 15/08* (2006.01)
*F04D 19/00* (2006.01)

(56) References Cited

U.S. PATENT DOCUMENTS

| | | | | |
|---|---|---|---|---|
| 2004/0135439 | A1* | 7/2004 | White | F04D 29/668 310/51 |
| 2009/0169387 | A1* | 7/2009 | Yoo | F04D 29/668 416/190 |
| 2010/0232933 | A1* | 9/2010 | Chen | F04D 25/0613 415/119 |
| 2011/0070080 | A1* | 3/2011 | Peng | F04D 19/007 415/214.1 |
| 2011/0135448 | A1* | 6/2011 | Chen | F04D 29/601 415/119 |
| 2012/0063886 | A1* | 3/2012 | Tsai | F04D 25/0613 415/119 |
| 2013/0028709 | A1* | 1/2013 | Chen | F04D 19/007 415/119 |
| 2013/0287604 | A1* | 10/2013 | Barkic | F16F 15/08 417/410.1 |
| 2015/0023779 | A1* | 1/2015 | Li | F04D 19/002 415/119 |
| 2015/0282384 | A1* | 10/2015 | Ho | H05K 7/20172 361/695 |
| 2016/0146224 | A1* | 5/2016 | Mutlu Bozay | F04D 29/668 62/296 |
| 2016/0164369 | A1* | 6/2016 | Wolf | H02K 5/24 310/51 |
| 2017/0152867 | A1* | 6/2017 | Lee | F04D 29/668 |
| 2018/0045223 | A1* | 2/2018 | Bailey | F04D 29/601 |
| 2019/0162462 | A1* | 5/2019 | Kim | F04D 29/164 |

OTHER PUBLICATIONS

Taiwanese Search Report for TW 107101147 (foreign filing of instant application) (Year: 2020).*

* cited by examiner

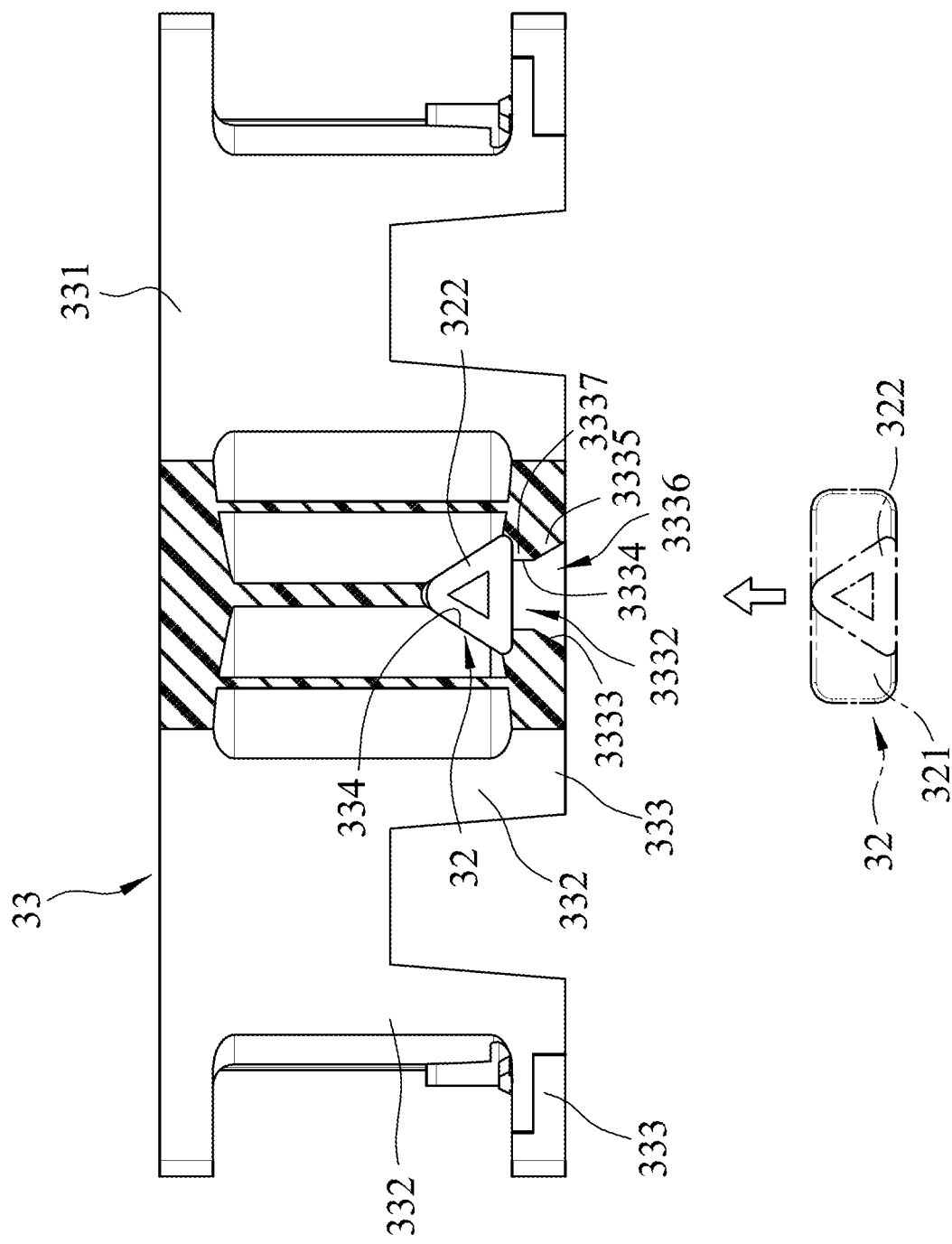

FAN WITH SHOCK-ABSORBING EFFECT

CROSS-REFERENCE TO RELATED APPLICATION

This application claims priority of Taiwanese Patent Application No. 107101147, filed on Jan. 12, 2018.

FIELD

The disclosure relates to a fan, and more particularly to a fan with shock-absorbing effect.

BACKGROUND

When a fan is in operation, an interaction force may be generated among assembled parts of the fan due to air resistance and reaction force caused by airflow generation. The interaction force prompts the assembled parts of the fan to vibrate alongside each other, producing abnormal noise and generating collisions among the assembled parts, which can eventually cause the fan to wear out.

Taiwanese Utility Patent Publication No. M381100 discloses a fan assembly 10 (see FIG. 1). In the fan assembly 10, a fan 20 is assembled with a first fixing component 11 and a second fixing component 111 through a plurality of damping nails 30. The damping nails 30 are made from a rubber material, and the elasticity and flexibility conferred by the rubber material enables the damping nails 30 to absorb impact forces generated by the aforementioned fan 20, first and second fixing components 11, 111 so as to achieve shock-absorbing effect. However, the damping nails 30 made from the rubber material cannot fixedly connect the first and second fixing components 11, 111 to the fan 20 through screwing mechanism. Thus, two fasteners 12 are required to fixedly connect the fan 20 and the first and second fixing components 11, 111. This would result in an increase in the size of the fan assembly 10, which not only takes up a lot of space, but also complicates the configuration of the fan assembly 10.

SUMMARY

Therefore, an object of the disclosure is to provide a fan with shock-absorbing effect that can alleviate at least one of the drawbacks of the prior art.

According to the disclosure, a fan includes a rotating unit and a housing unit. The rotating unit includes a base and a fan body that is rotatably mounted to the base. The housing unit includes an outer ring that surrounds and is connected to the base, a plurality of connecting members that are mounted to an outer peripheral surface of the outer ring and that are spaced apart from each other, and a base member that surrounds the rotating unit and the outer ring and that is connected to the connecting members. The base member of the housing unit has a plurality of receiving holes, and each of the connecting members is made of a shock-absorbing material, and is fixed in a respective one of the receiving holes.

BRIEF DESCRIPTION OF THE DRAWINGS

Other features and advantages of the present disclosure will become apparent in the following detailed description of the embodiment with reference to the accompanying drawings, of which:

FIG. 4 is a partly cross-sectional view of the embodiment illustrating the connecting member being embedded in the receiving hole.

DETAILED DESCRIPTION

Figure 1:
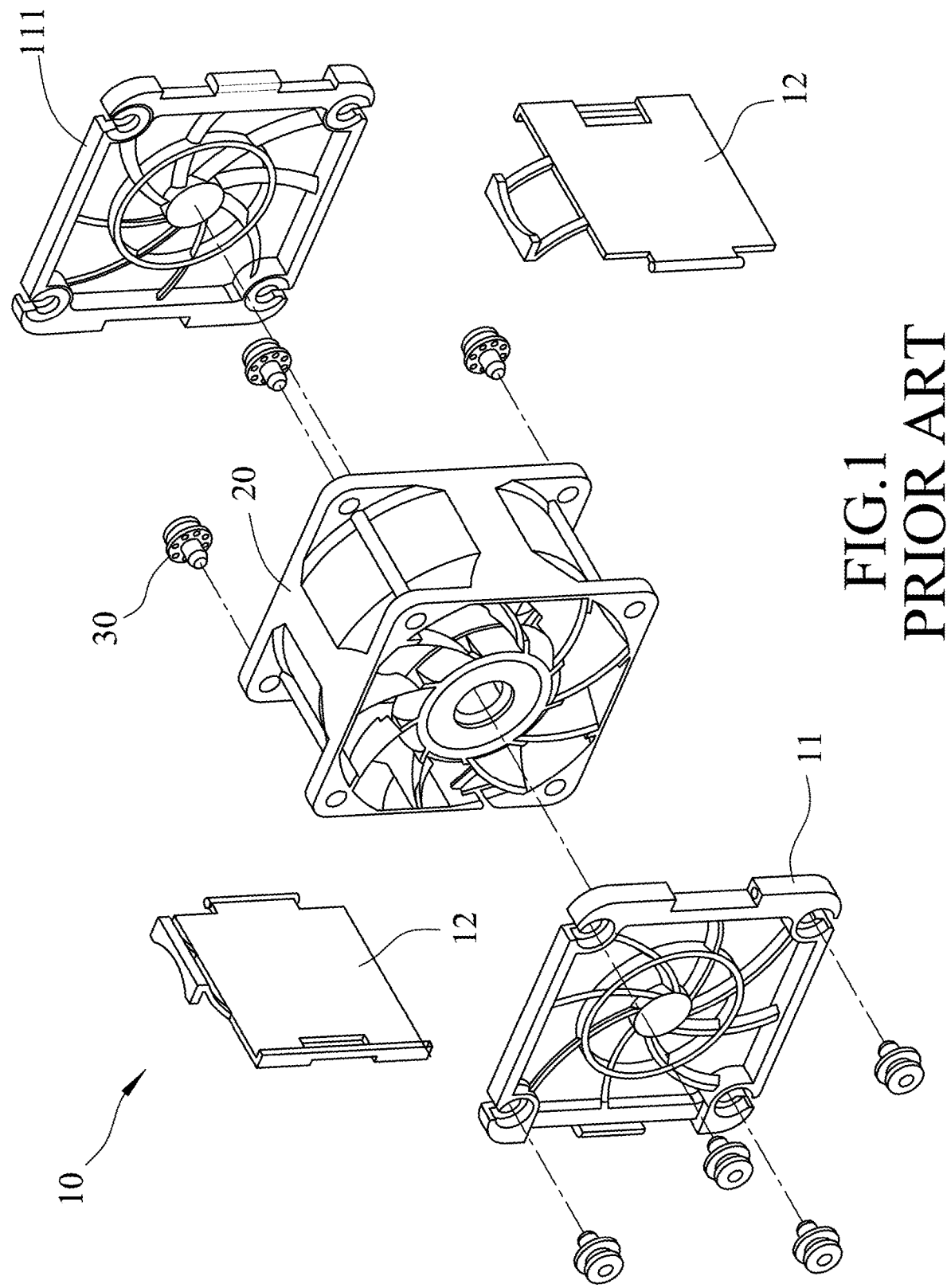
FIG. 1 is an exploded perspective view of a conventional fan assembly.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
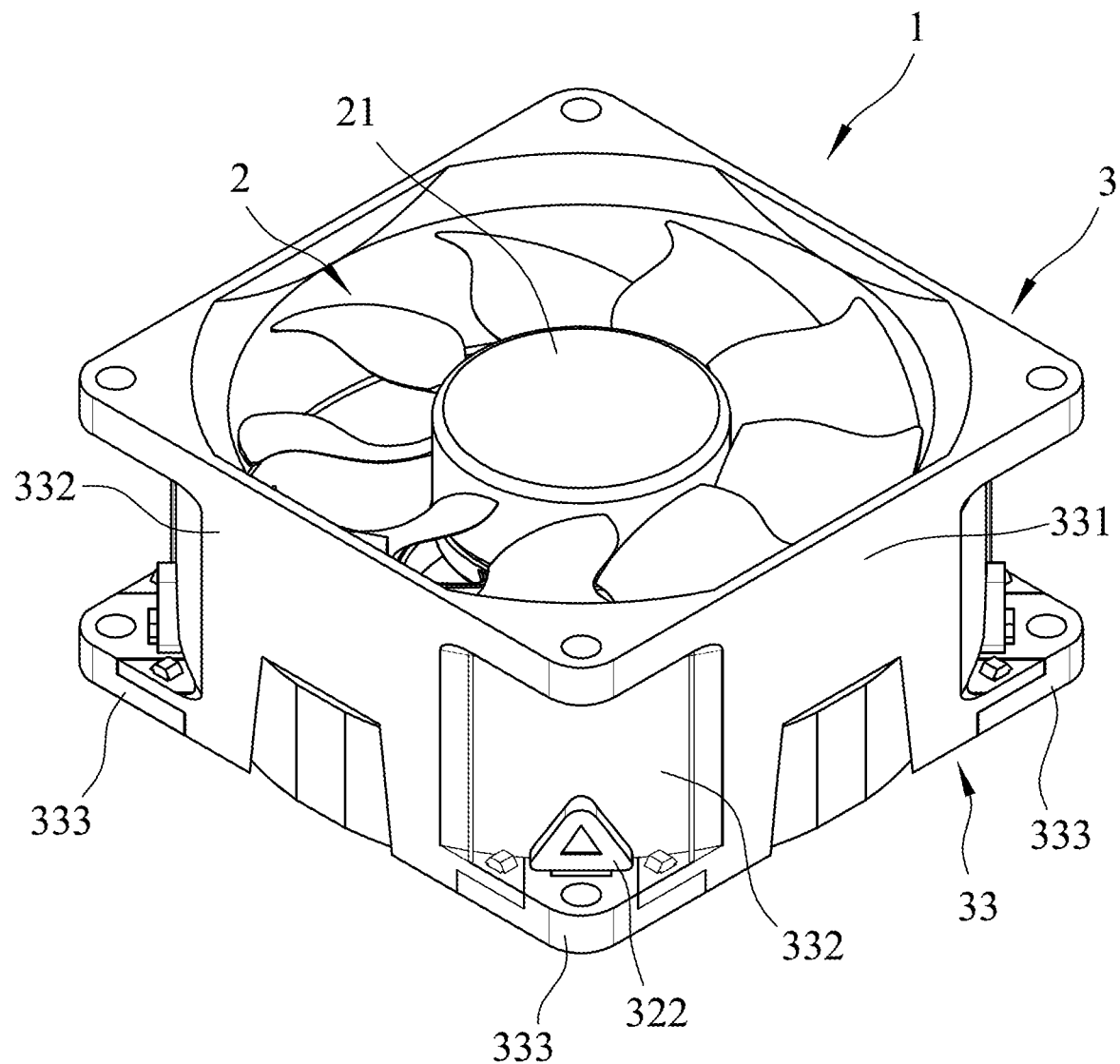
FIG. 2 is a perspective view of an embodiment of a fan according to the present disclosure.
Figure 3:
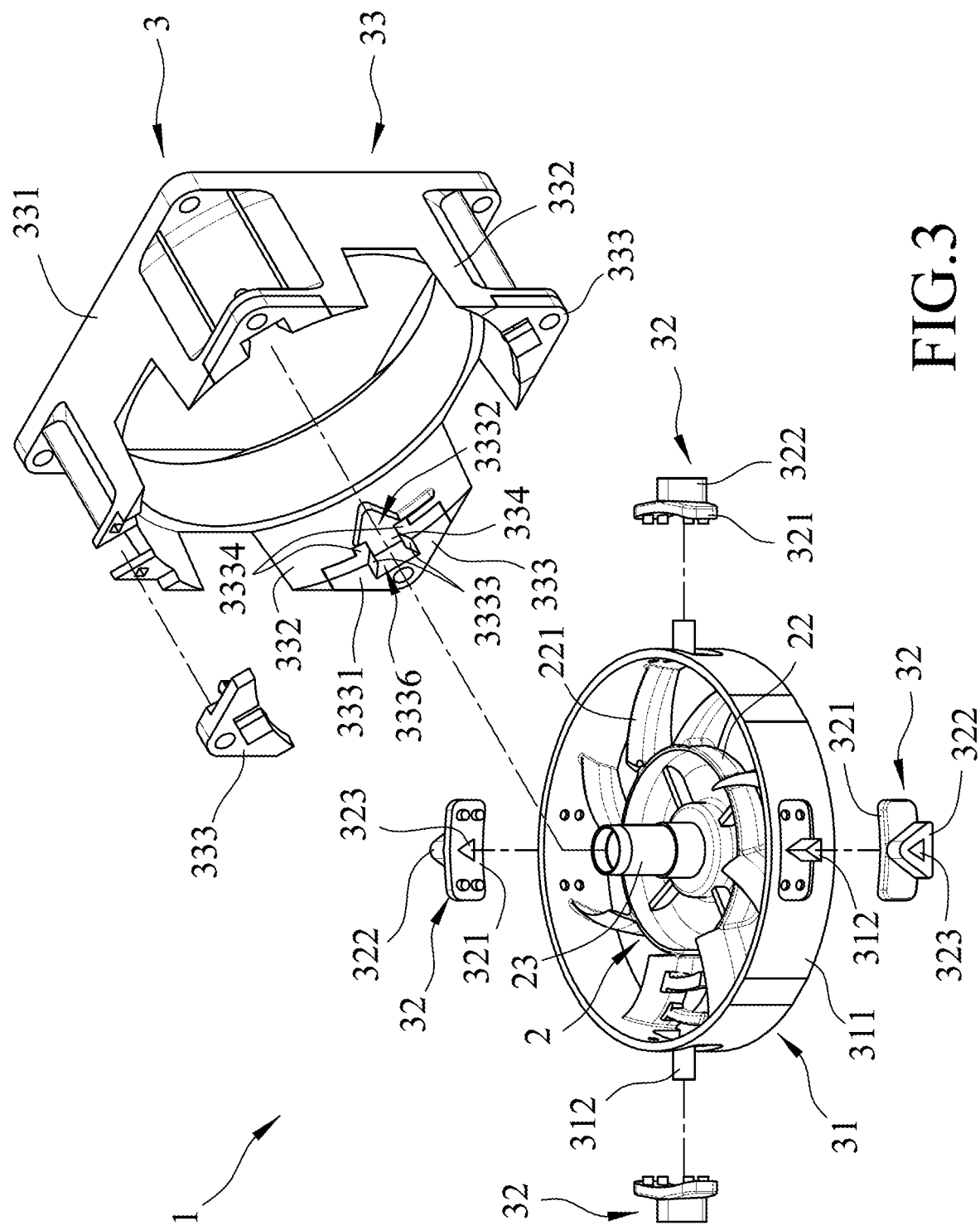
FIG. 3 is an exploded perspective view of the embodiment without showing a fan body.

Referring to FIGS. 2 and 3, an embodiment of a fan 1 of the present disclosure includes a rotating unit 2 and a housing unit 3 surrounding the rotating unit 2. The rotating unit 2 includes a base 22, a rotating shaft 23 and a fan body 21 that is rotatably mounted to the base 22 through the rotating shaft 23 and that is rotatable along a rotating axis. To be specific, in this embodiment, an inner side of the fan body 21 that faces the base 22 is provided with a magnet (not shown). The base 22 includes a blade-shaped frame 221 that is connected to the housing unit 3, and a coil (not shown) that faces the magnet of the fan body 21. The fan body 21 is able to rotate along the rotating axis relative to the base 22 through the interaction between the coil and the magnet. Since the rotation of the fan through the interaction between the coil and the magnet is well known by a skilled artisan, a detailed explanation thereof is omitted herein for the sake of brevity.

Referring to FIG. 3, the housing unit 3 includes an outer ring 31 that surrounds and is connected to the base 22, a plurality of connecting members 32 that are mounted to an outer peripheral surface 3111 of the outer ring 31 and that are spaced apart from each other, and a base member 33 that surrounds the rotating unit 2 and the outer ring 31 and that is connected to the connecting members 32. The outer ring 31 includes a ring body 311 that has the outer peripheral surface 3111, and that surrounds and is connected to the blade-shaped frame 221 of the base 22, and a plurality of protrusions 312 that extends from the outer peripheral surface 3111 of the ring body 311. In this embodiment, the outer ring 31 has four of the protrusions 312, and each of the protrusions 312 is shaped as a triangular pillar. However, in other embodiments, the number and the shape of the protrusions 312 may vary depending on practical needs.

According to the present disclosure, each of the connecting members 32 of the housing unit 3 is elastic and is made of a shock-absorbing material. In certain embodiments, the shock-absorbing material is rubber. The connecting members 32 includes a connecting block 321 that is positioned on the outer peripheral surface 3111 of the ring body 311 of the outer ring 31, and a protruding block 322 that extends from the connecting block 321 in a direction away from the base 22 of the rotating unit 2. In this embodiment, the connecting block 321 is embedded in the outer peripheral surface 3111 of the ring body 311 through the fittingly engaging manner. However, other connecting methods, e.g., threadly engaging, coupling, etc., may be applied for fixed connection of the connecting block 321 and the ring body 311. The connecting block 321 and the protruding block 322 of each of the connecting members 32 define a hole 323. Each of the protrusions 312 of the outer ring 31 extend through and fittingly engage the hole 323 of a respective one of the connecting members 32, so as to fixedly connect the connecting members 32 on the outer ring 31 and prevent rotation of the connecting members 32 relative to the protrusions 312, respectively. In certain embodiments, at least one of the holes 323 is non-circular. In certain embodiments, the holes 323 are non-circular through holes. In this embodiment, the holes 323 are triangular through holes so as to fittingly engage the protrusions 312 shaped as triangular pillars, respectively.

In this embodiment, the protruding block 322 of each of the connecting members 32 has a triangular tubular shape in which the triangular through hole 323 is formed (i.e., the shape of the protruding blocks 322 is corresponding to the shape of the hole 323). However, in certain embodiments, the shape of the protruding block 322 may be different from the shape of the corresponding hole 323 according to practical requirements. For example, for each of the connecting members 32, the protruding block 322 is shaped as triangular columnar blocks, the protrusion 312 is shaped as a semicircular pillar, and the hole 323 is shaped as a semicircular hole. In addition, the protruding block 322 of each of the connecting members 32 may also have a surface that is provided with an opening or a slit, so as to accommodate the increased amount of deformation of the protruding block 322 after compression.

Referring back to FIG. 3, the base member 33 has a plurality of receiving holes 334, and each of the connecting members 32 is fixed in a respective one of the receiving holes 334. In this embodiment, each of the receiving holes 334 is triangular-shaped so as to fittingly engage a corresponding one of the triangular tubular protruding blocks 322 of the connecting members 32.

Referring to FIGS. 2, 3 and 4, the base member 33 of the housing unit 3 includes a main body 331, a plurality of extending walls 332 that extends from the main body 331 and each of which has a distal end that is distal from the main body 331, and a plurality of attaching members 333 that are respectively mounted to the distal ends of the extending walls 332. The receiving holes 334 of the base member 33 are respectively formed in the distal ends of the extending walls 332. In this embodiment, the main body 331 of the base member 33 surrounds the fan body 21, the extending walls 332 surrounds the base 22 and the outer ring 31, and the base member 33 includes four of the attaching members 333. Each of the attaching members 333 is detachably mounted to the distal end of a corresponding one of the extending walls 332. In this embodiment, the attaching members 333 are respectively embedded in the distal ends of the extending walls 332 through the fittingly engaging manner; however, other connecting methods may be used in this disclosure. In certain embodiments, the number of the attaching members 333 and the corresponding extending walls 332 can be adjusted according to practical requirements.

Referring further to FIGS. 3 and 4, each of the attaching members 333 of the base member 33 has an attaching main body 3331 that is formed with an insertion passage 3332. The insertion passage 3332 is defined by two inner wall surfaces 3333 of the attaching main body 3331, which face each other, and two block walls 3334 respectively extending from the two inner wall surfaces 3333 toward a corresponding one of the receiving holes 334. The insertion passage 3332 spatially communicates with the corresponding one of the receiving holes 334 and has an outwardly diverging opening 3336 defined by the inner wall surfaces 3333. To be specific, each of the inner wall surfaces 3333 is outwardly diverged from a respective one of the block walls 3334. In this embodiment, the attaching main body 3331 has a diverging portion 3335 that has the two inner wall surfaces 3333, and a block portion 3337 that has the block walls 3334 and that extends from the diverging portion 3335 toward the corresponding one of the receiving holes 334.

An assembly method for the fan 1 of this embodiment according to the present disclosure is described as follows. First, the connecting members 32 are respectively fittingly sleeved on the protrusions 312 of the outer ring 31 so that the protrusions 312 are respectively inserted into the holes 323. Then, each of the connecting members 32 is forced to enter through the insertion passage 3332 of a corresponding one of the attaching members 333, and then into the receiving hole 334 of the corresponding one of the extending walls 332. In this embodiment, when each of the connecting members 32 is received in the respective one of the receiving holes 334, the connecting member 32 abuts against the two block walls 3334 of a respective one of the attaching members 333 so as to be prevented from removal from the respective one of the receiving holes 334, while being allowed to enter the corresponding one of the receiving holes 334 through the outwardly diverging opening 3336 of the insertion passage 3332 of a respective one of the attaching members 333 by deformation during passing through the insertion passage 3332. To be specific, when each of the connecting members 32 is inserted into the insertion passage 3332, the protruding block 322 would be blocked by the block walls 3334, and thus is not movable. At this time, a force is applied to the protruding block 322 to render the elastic protruding block 322 deformed, so that the protruding block 322 is able to enter the insertion passage 3332 through the outwardly diverging opening 3336, and finally reaches and be received in the receiving hole 334. Since the protruding blocks 322 are made of the elastic material, the shape of the protruding blocks 322 received in the receiving holes 334 is restored to its original shape. It should be noted that, with the outwardly diverging opening 3336, the connecting members 32 can easily be inserted into the insertion passage 3332, thereby improving the assembling efficiency of the fan 1.

To sum up, with inclusion of the connecting members 32 and the attaching members 333, the rotating unit 2 and the housing unit 3 can be firmly assembled. Moreover, since the connecting members 32 are made of the elastic and shock-absorbing material, the vibration generated by rotation of the rotating unit 2 can be absorbed. Furthermore, with the outwardly diverging opening 3336, the connecting members 32 can be easily inserted into the insertion passage 3332, thereby improving the assembling efficiency of the fan 1 of this disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A fan, comprising:
a rotating unit including a base, and a fan body that is rotatably mounted to said base; and
a housing unit including an outer ring that surrounds and is connected to said base, a plurality of connecting members that are mounted to an outer peripheral surface of said outer ring and that are spaced apart from each other, and a base member that surrounds said rotating unit and said outer ring and that is connected to said connecting members;
wherein said base member has a plurality of receiving holes, and each of said connecting members is made of a shock-absorbing material, and is fixed in a respective one of said receiving holes,
wherein said base member of said housing unit includes a main body, a plurality of extending walls that extend from said main body, and a plurality of attaching members that are respectively mounted to distal ends of said extending walls, said receiving holes being respectively formed in said distal ends of said extending walls,
wherein each of said attaching members has an attaching main body that is formed with an insertion passage defined by two inner wall surfaces of said attaching main body, which face each other, and two block walls respectively extending from said two inner wall surfaces toward a corresponding one of said receiving holes, said insertion passage being spatially communicated with the corresponding one of said receiving holes and having an outwardly diverging opening defined by said two inner wall surfaces, and
wherein each of said connecting members is elastic and abuts against said two block walls of a respective one of said attaching members so as to be prevented from removal from a corresponding one of said receiving holes, while being allowed to enter the corresponding one of said receiving holes through said outwardly diverging opening of said insertion passage of a corresponding one of said attaching members by deformation during passing through said insertion passage.

2. The fan as claimed in claim 1, wherein said attaching members are respectively and detachably mounted to said distal ends of said extending walls.

3. The fan as claimed in claim 1, wherein each of said connecting members includes a connecting block that is positioned on said outer peripheral surface of said outer ring, and a protruding block that extends from said connecting block and that fittingly engages with a corresponding one of said receiving holes.

4. The fan as claimed in claim 3, wherein said protruding block of each of said connecting members has a triangular cross-section.

5. The fan as claimed in claim 3, wherein:
said outer ring of said housing unit includes a ring body that has said outer peripheral surface and that surrounds and is connected to said base, and a plurality of protrusions that extends from said outer peripheral surface of said ring body;
said connecting block and said protruding block of each of said connecting members define a hole; and
said protrusions of said outer ring respectively extend through and fittingly engage said holes of said connecting members.

6. The fan as claimed in claim 5, wherein said holes of said connecting members are non-circular through holes.

7. The fan as claimed in claim 1, wherein each of said connecting members of said housing unit is made of rubber.

* * * * *